Sept. 6, 1966   P. W. COLLYER   3,270,612
SERVO NULLED AUTOCOLLIMATOR HAVING A PAIR OF ROTATABLE WEDGES
Filed Nov. 7, 1962   2 Sheets-Sheet 1

INVENTOR.
PHILIP WARDHAM COLLYER
BY
Robert Ames Norton
ATTORNEY

United States Patent Office 3,270,612
Patented Sept. 6, 1966

3,270,612
SERVO NULLED AUTOCOLLIMATOR HAVING A PAIR OF ROTATABLE WEDGES
Philip Wardham Collyer, Stamford, Conn., assignor to Barnes Engineering Company, Stamford, Conn., a corporation of Delaware
Filed Nov. 7, 1962, Ser. No. 236,024
3 Claims. (Cl. 88—14)

This invention relates to an improved multiple axis photoelectric autocollimator and more particularly to improved readout mechanism.

Photoelectric autocollimators are extensively used to effect very accurate monitoring of the rotation of an external reflecting surface about a predetermined axis. Among the autocollimators those using polarized light have proven to be the most efficient and it is with this class of autocollimators that the present invention deals. A typical polarized light autocollimator is described in the patent of Collyer 3,031,919, May 1, 1962. Essentially the instrument produces a beam of polarized light, the plane of polarization of which continuously rotates. In the Collyer patent a rotating polarizer is used. As will be pointed out below modifications have been developed in which the polarized beam does not rotate initially.

In the Collyer patent the rotating polarized beam is reflected out of the instrument through collimating optics, the reflecting means being in the form of a beam splitter. The collimated beam strikes the external reflecting surface such as a mirror, the rotation of which it to be monitored, and a beam is reflected back onto the instrument passing through the beam splitter and being imaged by the collimating optics onto a split field analyzer from which the beam passes onto a radiation detector, for example a photomultiplier tube. When the image is centered on the split field analyzer there is an equal amount passing through each half of the field and the electrical output from the photomultiplier tube, therefore, consists of equal signals pulsing in opposite phases. When the beams are equal the signals cancel in the electronic circuits of the instrument constituting a null and when there is movement of the image on the analyzer because of rotation of the reflecting surface there will be a net alternating voltage produced in phase with the stronger beam. The electronic circuits, which are provided with suitable phase sensitive detectors, then produce an output which indicates the degree of rotation of the reflecting surface.

In the copending application of Daley, Serial No. 41,389 filed July 7, 1960, now Patent 3,087,377, April 30, 1963 there is described an improved autocollimator in which the beam is a stationary beam of circularly polarized light and a quarter wave plate is rotated in front of the split field analyzer transforming the reflected circularly polarized beam into a plane polarized beam the plane of polarization of which rotates. This improvement has the advantage that no spurious effects are introduced due to small amounts of plane polarization from the various reflections. In each case the output of the photomultiplier tube or other radiation detector is the same. In my copending application, Serial No. 52,742 filed August 29, 1960, now abandoned, there is described a modified autocollimator in which the output signal turns a wedge in the beam through suitable servo mechanisms and the degree of displacement of the image from the central line of the split field analyzer is derived from the motion of the wedge, the autocollimator being used to determine when a null is reached. It is also possible to project and reflect an unpolarized beam and place the means for transforming the beam in a rotating plane polarized beam just before the analyzer.

All of the above autocollimators are capable of monitoring, with great precision, rotations of a reflecting surface about a single axis. They have achieved practical success particularly in the Navy where problems involving a single axis of rotation are encountered. There are other problems, for example those involving flexure of a structure in which it is desirable to measure rotation about two orthogonal axes. It is, of course, possible to use two entirely separate single axis autocollimators but this requires calibration problems and, of course, multiplies equipment. Two axis autocollimators have been developed and are described in the copending application of Daley and Astheimer, Serial No. 236,025 filed November 7, 1962.

In this application there is used a split field analyzer with four quadrants, opposite quadrants polarizing at right angles to each other and adjacent quadrants at 45°. A single radiation detector is used with electronic circuits which are provided with suitable phase detectors. It is with an improved readout mechanism, particularly but not exclusively, for the two axis autocollimators of the type described in the Daley and Astheimer application that the present invention is primarily concerned. It will be pointed out below that the present invention can also be used with two parallel single axis autocollimators sharing a common reflector and optical nulling means or with an autocollimator having two detectors. Therefore, the mechanism and electric circuits which constitute the present invention may be used with autocollimators other than the one described in the Daley and Astheimer application although this constitutes the preferred species of the present invention.

At first glance it might be thought that all that would be necessary with the autocollimator described in my copending application above referred to is to provide another autocollimator and two wedges at right angles to each other, one for measuring rotation about one axis and one about the other. When it is attempted to use two wedges, optically in series, however, the device is inoperative for uses which require any significant degree of precision. The principal problem results from the fact that movement of one wedge interacts with the movement of the other. It is with the solution of this problem that the present invention is particularly concerned. Essentially there are provided two resolving mechanisms or circuits, one for the results of rotation about each axis and each resolving means responding to the movement of both wedges. The solution of the problem was developed as follows.

Let us assume the situation where the autocollimators, or the combined autocollimator of the Daley and Astheimer application, respond to rotation about both axes. The output from the photomultiplier tube will, therefore, have components in two phases, one corresponding to deviations about one axis and one about the other. For simplicity these two axes will be referred to in the specification as azimuth and elevation because the most common uses of the invention involve rotations about these two axes. Of course, it is immaterial what the two axes are so long as they are at right angles to each other and approximately at right angles to the autocollimator projection axis. The component corresponding to azimuth monitoring will cause the azimuth wedge to move and the component corresponding to elevation will cause the elevation wedge also to move. Let the angle through which the azimuth wedge is turned be designated $\theta_1$ and the angle through which the elevation wedge is moved be designated $\theta_2$. A rotation of either wedge, however, influences the signal from the other axis. The effect on azimuth signal of the turning of the azimuth wedge is proportional to $\sin \theta_1$ but this also affects the other signal component by an amount proportional to $1 - \cos \theta_1$. The corresponding effect on elevation signal will be noted in the movement of the other wedge but in this case, of course, the effects are porportional to $\sin \theta_2$ and $1 - \cos \theta_2$ respectively.

Resolvers are provided which receive information from the rotation of the two wedges. The resolvers are provided with a rotating component which is rotated by an amount proportional to the angle through which each wedge is turned. Each resolver receives a reference voltage which in its more general case will not be assumed to be the same and will be designated $E_1$ for the azimuth resolver and $E_2$ for the elevation resolver. The resolvers each have outputs corresponding to sin and cos of the angle through which their respective wedges are turned. The outputs from the two resolvers can then be connected in series with a transformer in such a way as to provide output voltages as follows:

Azimuth resolver circuit output
$$= E_1 \sin \theta_1 + E_2 \cos \theta_2 - E_2$$

Elevation resolver circuit output
$$= E_2 \sin \theta_2 + E_1 \cos \theta_1 - E_1$$

The third term in each equation is derived from the transformer, and has the function of a constant bias to make the respective outputs equal to zero when $\theta_1$ and $\theta_2$ are zero. The present invention utilizes wedges initially at right angles to each other, one turned by the detector signal of one phase and the other by the signal of the other phase. When the two wedges have turned to the point at which they have exactly compensated for the rotations of the reflector to be monitored about the two axes, the resolvers of the present invention are designed to produce separate readouts as described by the above equations.

Since the present invention does not change the internal construction of the polarized light autocollimators they will not be shown in detail but only schematically. Similarly the electronic circuits, with the exception of the resolvers, are also conventional electronic circuits though they are arranged in a new manner to produce the result of the present invention. They will, therefore, be illustrated in block diagram form.

The invention will be described in greater detail in conjunction with the drawings in which.

Figure 1:
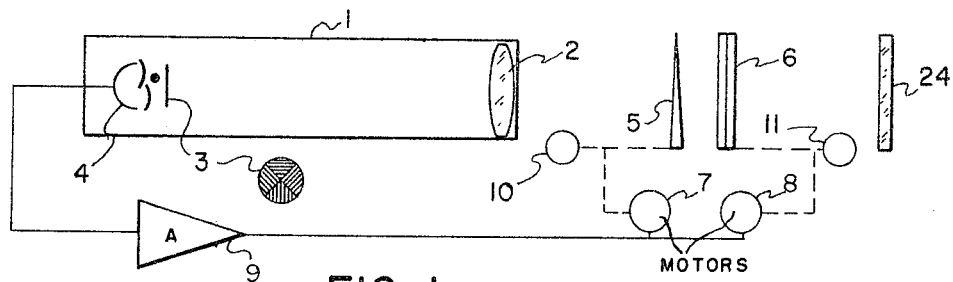
FIG. 1 is a diagram of a two axis autocollimator according to the Daley and Astheimer application.

In FIG. 1 the autocollimator is shown with a housing 1, collimating lens 2, four quadrant analyzer 3 and photomultiplier tube 4. The mirror 24 is shown at the right. Below the autocollimator is shown an elevation of the four quadrant analyzer, the direction of the polarization being indicated conventionally by hatching. The rest of the mechanism of the autocollimator for projecting polarized light and imaging the reflected collimated beam onto the split field analyzer is not changed from conventional photoelectric autocollimators such as that described in the Collyer patent referred to above and so is not shown as it is not changed by the present invention. Similarly these elements are not shown in any of the other drawings.

The collimated light beam passes through an azimuth wedge 5 and an elevation wedge 6 both before and after being reflected back from the mirror 24. The wedges are illustrated as simple wedges though in practice they will ordinarily be cemented doublets to produce more nearly achromatic operation. Each wedge is turned by a motor 7 and 8 respectively through precision, but conventional, reduction gearing. One winding of each motor receives current from the amplifier 9 which is an A.C. amplifier connected to the output of the photomultiplier tube 4. The motors receive in their other windings reference currents in quadrature to each other as will be described in greater detail in conjunction with FIG. 4. Since the torque in each motor is developed when the current in one winding is in quadrature with that in the other winding the wedges are turned only in response to currents from the output of the amplifier 9 in the proper phase.

Two resolvers or readout mechanisms 10 and 11 are turned in step with the rotation of the wedges 5 and 6 respectively. Their circuits will be described in more detail below in connection with FIG. 5.

Figure 2:
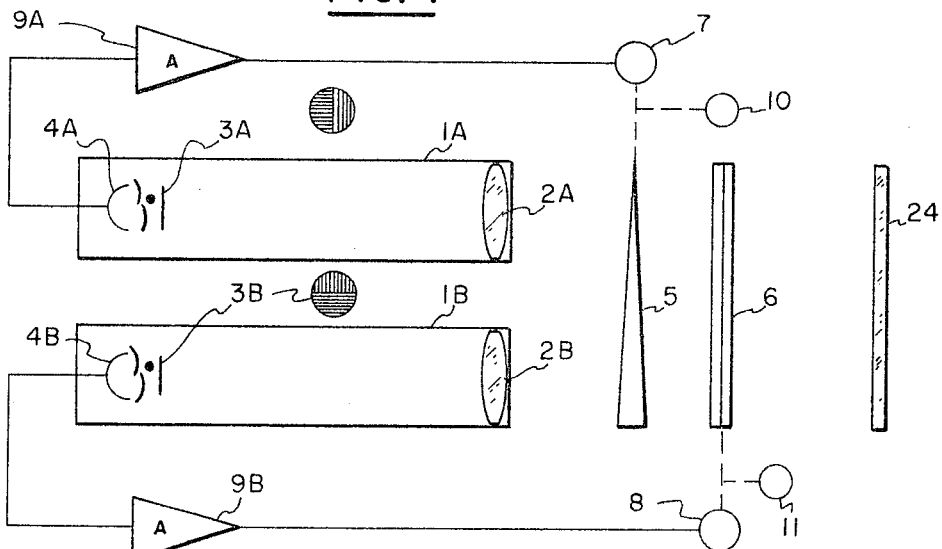
FIG. 2 is a diagrammatic showing of two single axis autocollimators sharing the same wedges and mirror.

FIG. 2 shows a modification in which two autocollimators are used, the motors, wedges and resolvers bearing the same reference numerals as in FIG. 1. The autocollimators are single axis instruments, for example as described in the Collyer patent above. The instruments are shown aligned to produce two parallel collimated beams. They are generally shown with corresponding parts having corresponding reference numerals, the azimuth analyzer bearing the reference "3A" and the elevation "3B." The analyzers, as is shown below the autocollimators, are simple split field analyzers. It will be seen that the two autocollimators produce separate signals instead of both signals being combined in different phases in the same amplifier as in FIG. 1. These signals can be adjusted independently to be in quadrature with the respective reference currents. Therefore, the two motors may receive reference signals in the same phase, which may be that of the line. Otherwise, the operation is the same as in FIG. 1.

Figure 3:
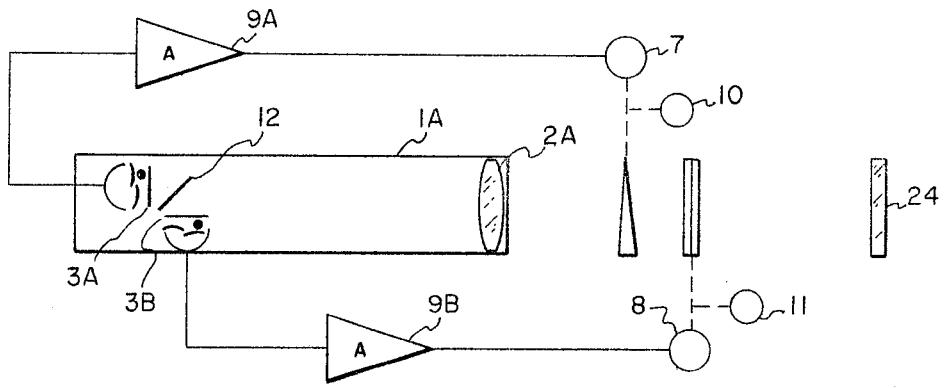
FIG. 3 is a diagram of two autocollimators combined in a single housing and using common projecting and reflecting optics.

FIG. 3 shows a modification of FIG. 2 in which the autocollimator has a single housing and single optics but is provided with two split field analyzers and two radiation detectors, the analyzers and detectors each receiving a portion of the reflected beam by means of the beam splitter 12. The numbering of analyzers and radiation detectors are the same as in FIG. 2. Essentially FIGS. 2 and 3 are functionally the same except that there are a number of common parts in the autocollimator housing, the economy being obtained at the cost of dividing the energy in the beam. This, however, is not a serious problem as the autocollimator ordinarily has plenty of energy to spare.

Figure 4:
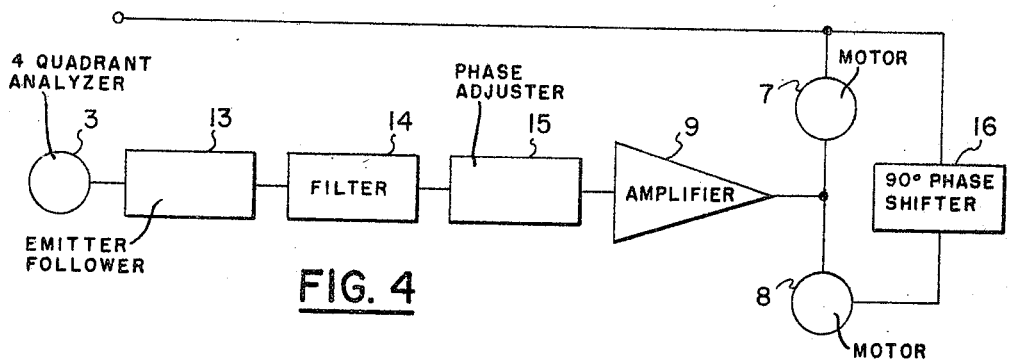
FIG. 4 is a block diagram of the electronic circuits for the two motors in FIG. 1 and, FIG. 5 is a schematic diagram of the resolving readouts.

FIG. 4 shows a block diagram for the modification of FIG. 1. The output from the photomultiplier tube after passing through an emitter follower 13 is sharply filtered to the frequency of the reference signals for the motors. Ordinarily this will be the frequency of the line indicated on the figure. Rotation of the polarizing beam in the autocollimator is in synchronism so that the azimuth and elevation error signals are also at the same frequency. The filter 14 by sharp tuning to this frequency eliminates practically all noise from the system and as the motors constitute devices which respond only to one frequency there is no loss of energy by filtering out noise. Finally the signal passes through a phase adjuster 15 before being amplified in the amplifier 9. This phase adjuster theoretically would be unnecessary if it were possible to mount the rotary polarizing element in the autocollimator in exact phase alignment. In practice this is not possible. Of course, the frame of the motor turning the rotating polarizer could be slightly moved to adjust phase but it is simpler and more desirable to effect this electronically in a conventional phase adjusting circuit 15. The two motors 7 and 8 are connected to the line with an interposed conventional 90° phase shifting circuit 16 so that one motor receives a reference signal 90° out of phase with that of the other motor. Accordingly, one motor responds only to the phase of the signal corresponding to rotation of the mirror 24 about one axis and the other to the signal of phase corresponding to rotation about the other axis.

Figure 5:
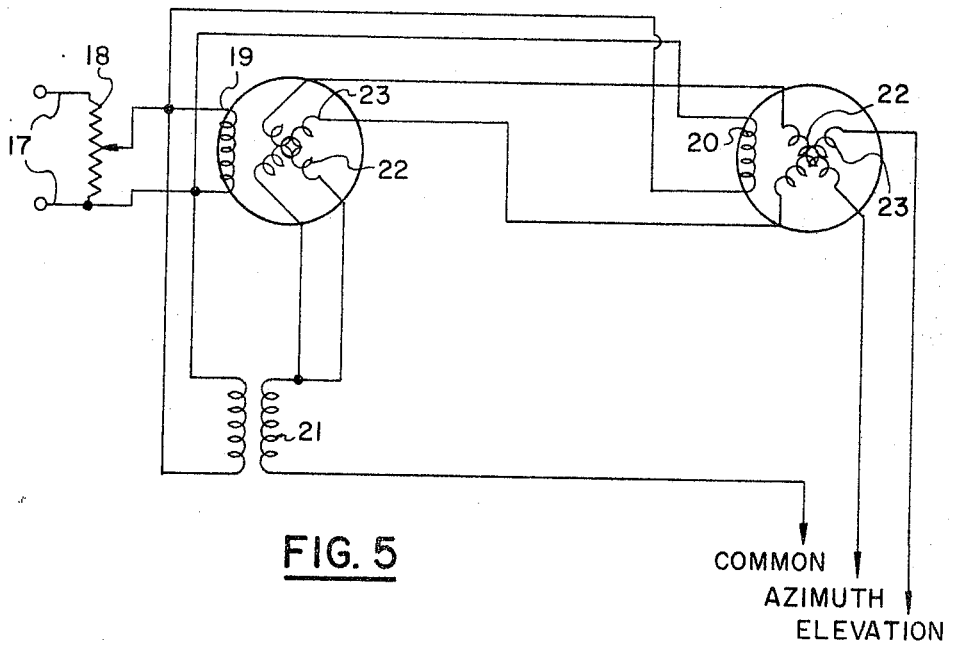

FIG. 5 shows a schematic diagram of the readout mechanism which, together with the arrangement of motors, signals and wedges, forms the heart of the present invention. In the figure there is supplied a current from the line 17 with a potentiometer 18 for adjustment of readout scale factor. This signal is fed in parallel to the windings 19 and 20 respectively of the two resolvers 10 and 11. A one to one transformer 21 is in series with crossed windings 22 and 23 in the resolvers. When the resolvers are turned these windings produce outputs proportional to sine and cosine respectively of the angles through which the wedges and hence the resolvers are turned. It will be seen that there are two outputs for elevation and azimuth and each includes the factors introduced by the turning of both wedges. When there has been no turning, of course, the outputs are cancelled out and read zero. The mathematics which was developed above and which permits cancelling out or compensating for the interaction of the two wedges on the two output signals is effected automatically and electrically. In FIG. 5 the voltages $E_1$ and $E_2$ are equal, since they are proportional to the same voltage produced by the potentiometer 18 the magnitude of the voltage being determined by the setting of the potentiometer 18 and, therefore, of course, this will influence the scale reading of the final output instruments which are conventional meters, recorders or the like. Once the potentiometer 18 has been set for the desired scale it does not normally require readjustment unless the line voltage changes by substantial amounts.

It will be seen that the present invention produces automatically a precise reading of rotations of the mirror 24 about the two axes and it accomplishes this result with relatively simple elements and a minimum of moving parts even the the parts which move, move fairly slowly and in the case of the wedges and resolvers through a small arc. In practice the range of motion of the wedges is limited to a total of about 30° each.

I claim:

1. In a polarized light autocollimating system for monitoring rotations of a reflecting surface about two orthogonal axes which system includes means for producing at least one beam of polarized light, the plane of polarization of which rotates, means for collimating said beam and the beam being aimable at the reflecting surface and being reflected back therefrom in a beam striking the said means for producing collimation, the improvement which comprises (a) polarizing analyzing means having polarizations totaling four and comprising pairs of polarizing means polarized at right angles to each other in each pair and at 45° to each other between pairs, (b) said means for collimating said beam further causing the reflected beam from the reflecting surface to be imaged on the analyzing means, (c) radiation detecting means transforming radiation into four electrical signals in phases at 90° to each other, a pair of the signals, 180° to each other, being derived from the reflected beam through one pair of said polarizing analyzing means and the other pair derived from the other pair of polarizing analyzing means, (d) two transparent wedges, the respective tapers of said wedges being initially substantially at right angles to each other and positioned transverse to the collimated beam so that the beam, before and after reflection from the reflecting surface, passes therethrough, (e) means for rotating the wedges independently through limited arcs $\theta_1$ and $\theta_2$ respectively, the axes of rotation being parallel to the collimated beam and the arcs being less than about 30°, each means being actuated by one of said pairs of signals from the detecting means, and (f) electronic resolving means connected to move through the same angles as the two wedges and provided with input A.C. voltages and output circuits, one giving a signal proportional to $\sin \theta_1 + \cos \theta_2 - 1$ and the other an output signal proportional to $\sin \theta_2 + \cos \theta_1 - 1$, whereby the outputs from the resolving means indicate the amount of rotation of the reflecting surface about the two axes.

2. A polarized light autocollimating system according to claim 1 in which (a) a single collimated beam of rotating plane polarized light is produced, and (b) there is a single radiation detecting means and a unitary polarizing analyzing means.

3. In a polarized light autocollimating system for monitoring rotations of a reflecting surface about two orthogonal axes, which system includes means for producing two beams of polarized light the planes of polarization of which rotate, means for collimating each beam, the beams being aimable at the reflecting surface and being reflected back therefrom in beams striking said means for collimating the beams, the improvement which comprises (a) split field polarizing analyzing means positioned in each beam, one portion of each split field polarizing analyzing means having its axis of polarization perpendicular to the other portion, and the two split field polarizing analyzing means being so positioned that the dividing line between the two portions that constitute the split field in the respective split field polarizing analyzing means is at 90° with respect to the other, (b) the means for collimating the said beams further being positioned to cause the respective reflected beams from the reflecting surface to be imaged respectively on the two split field polarizing analyzing means, (c) the radiation detecting means in each reflected beam receiving radiation after passing through the split field polarizing analyzing means, said radiation detecting means transforming the radiation into two electrical signals in phases at 90° to each other, (d) two transparent wedges, the respective tapers of said wedges being initially substantially at right angles to each other and positioned transverse to the collimated beam so that the beam, before and after reflection from the reflecting surface, passes therethrough, (e) means for rotating the wedges independently through limited arcs $\theta_1$ and $\theta_2$ respectively, the axes of rotation being parallel to the collimated beam and the arcs being less than about 30°, each means being actuated by one of said pairs of signals from the detecting means, and (f) electronic resolving means connected to move through the same angles as the two wedges and provided with input A.C. voltages and output circuits, one giving a signal proportional to $\sin \theta_1 + \cos \theta_2 - 1$ and the other an output signal proportional to $\sin \theta_2 + \cos \theta_1 - 1$, whereby the outputs from the resolving means indicate the amount of rotation of the reflecting surface about the two axes.

No references cited.

JEWELL H. PEDERSEN, *Primary Examiner.*

O. B. CHEW, *Assistant Examiner.*